Figure 4:
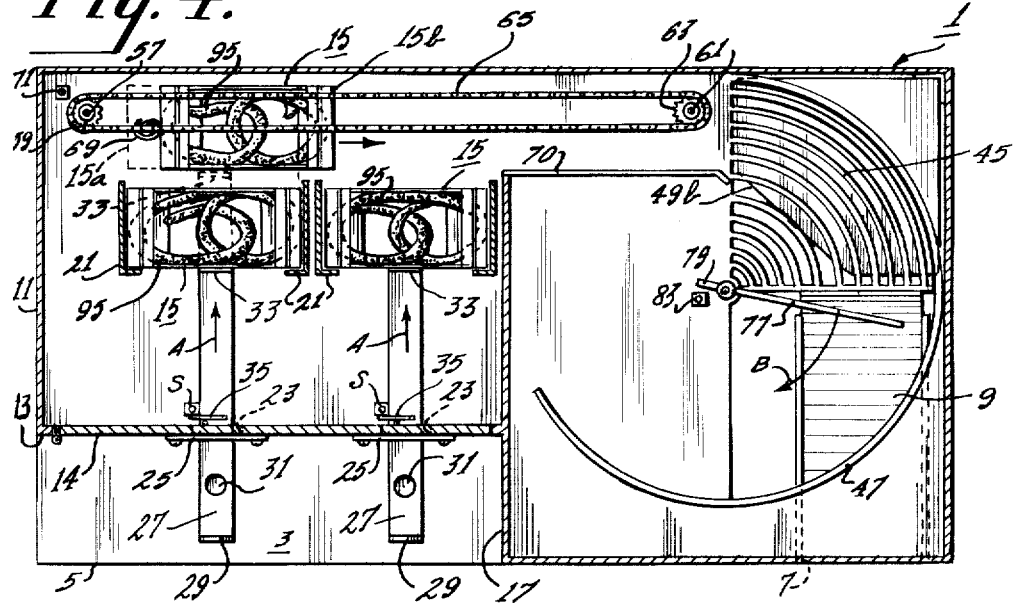

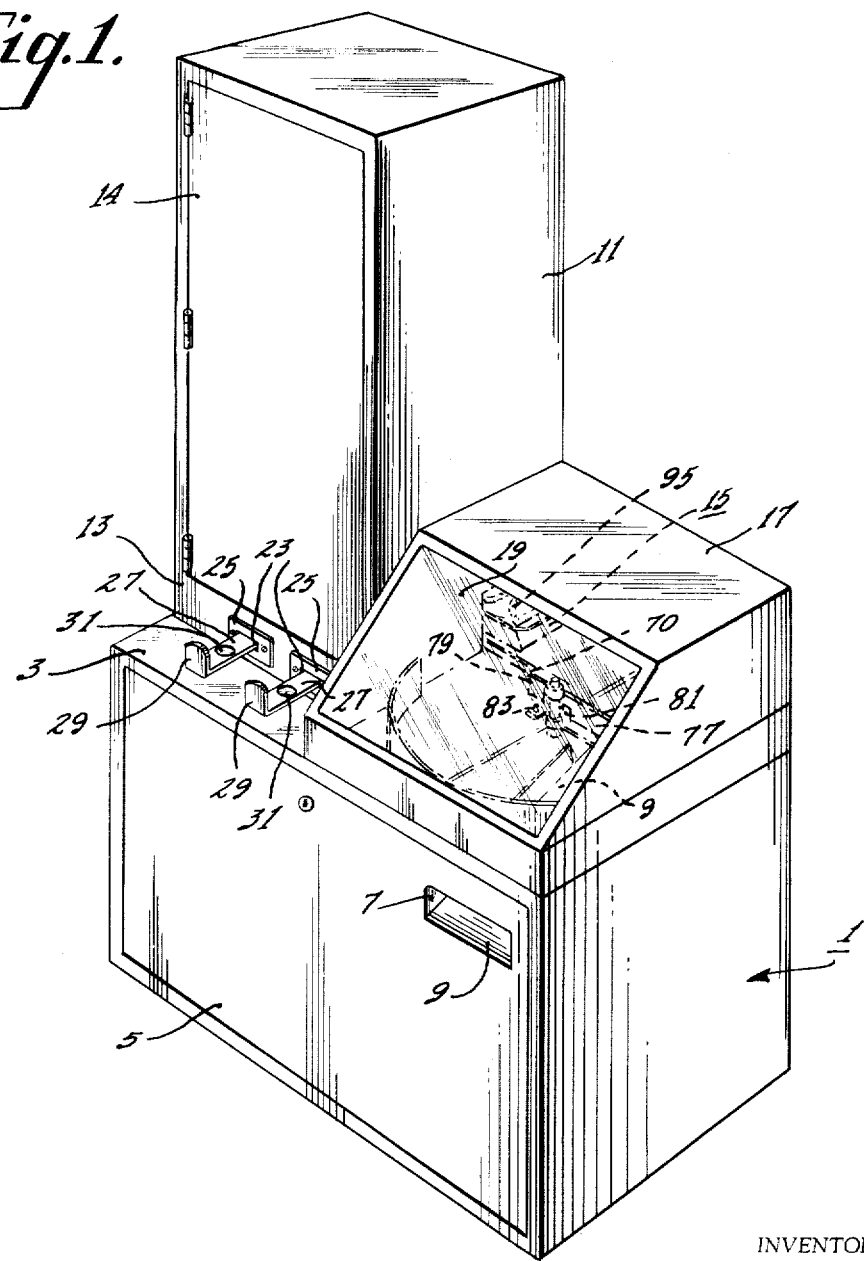

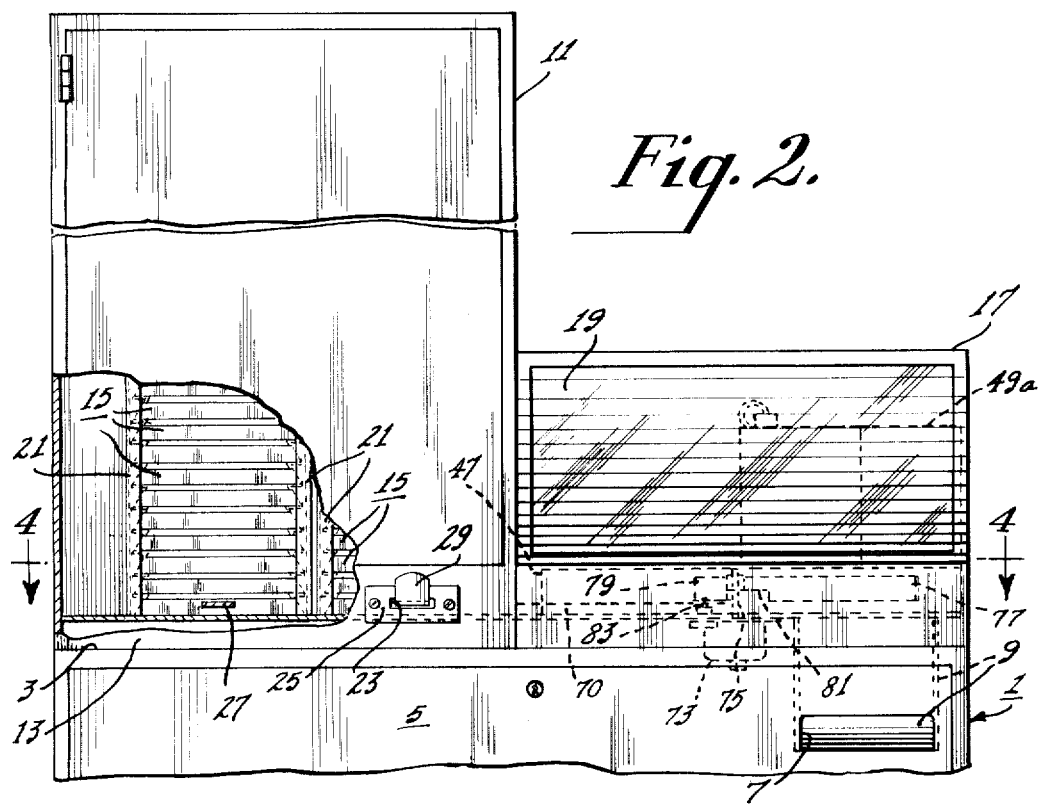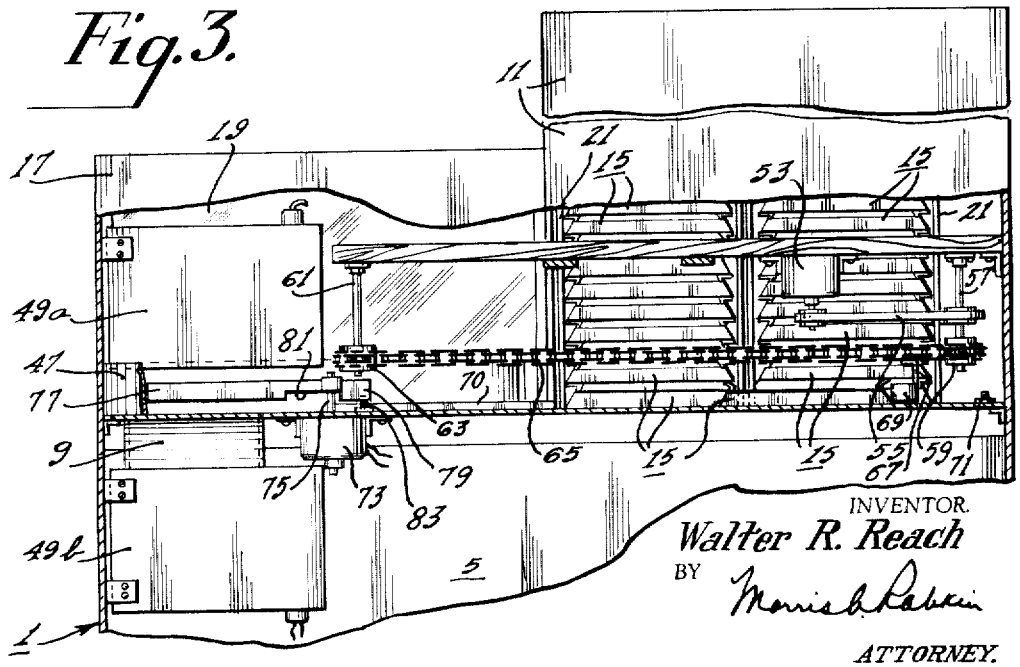

INVENTOR.
Walter R. Reach
BY
ATTORNEY.

INVENTOR.
Walter R. Reach
BY
ATTORNEY.

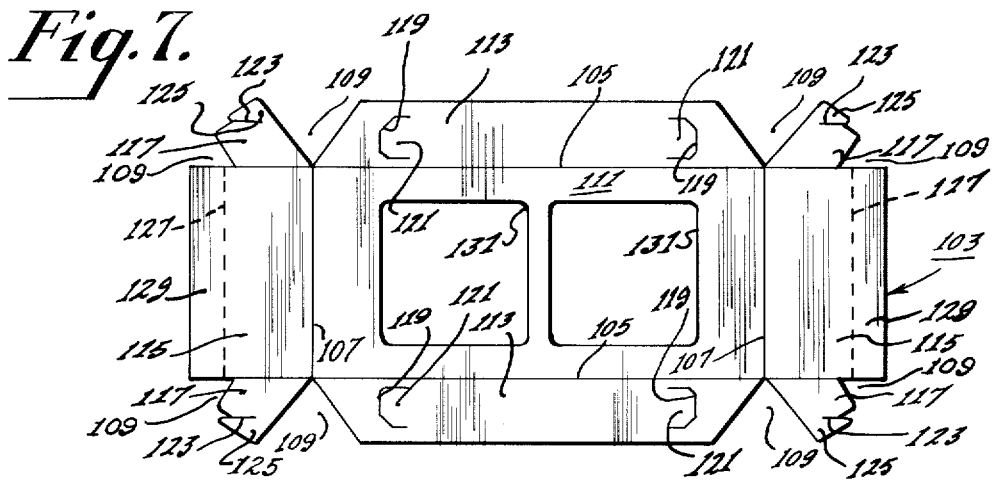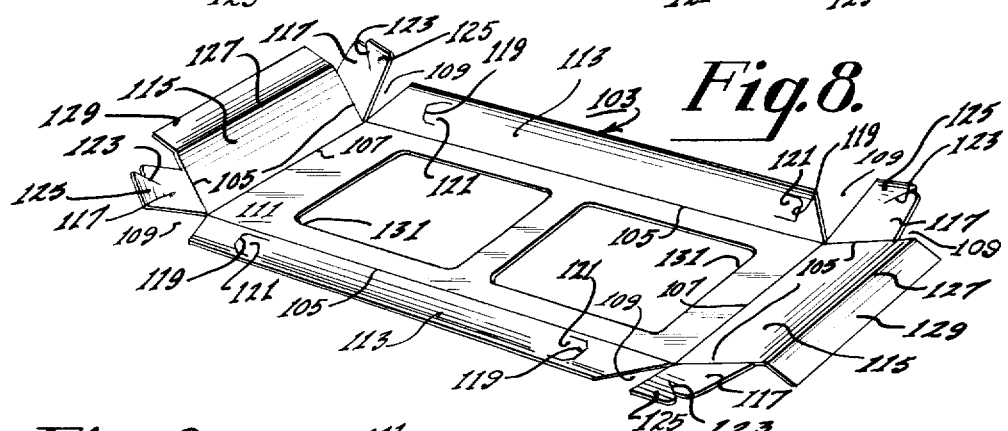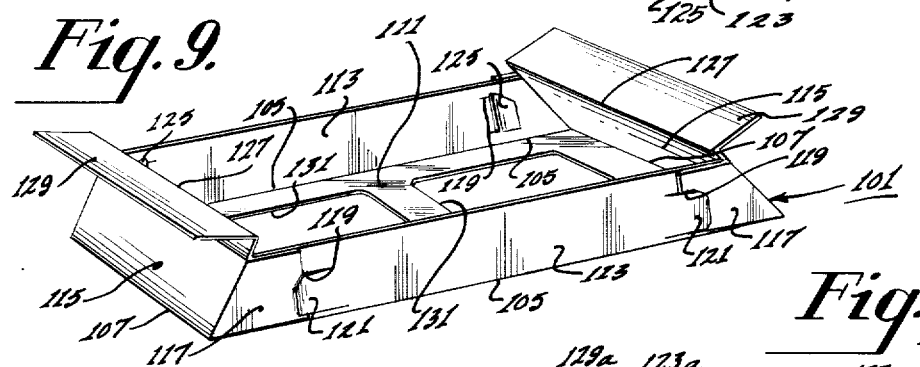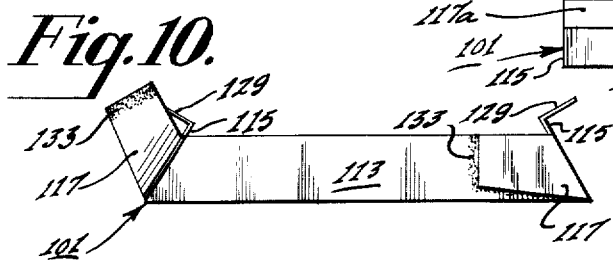

United States Patent Office 3,245,581
Patented Apr. 12, 1966

3,245,581
APPARATUS FOR VENDING HEATED
COMESTIBLE PRODUCTS
Walter R. Reach, 588 Washington Terrace,
Audubon, N.J.
Filed July 6, 1964, Ser. No. 380,456
11 Claims. (Cl. 221—150)

This invention relates to vending apparatus, and particularly to coin controlled apparatus for vending comestibles which are to be heated prior to delivery.

There are a number of comestible products which, while quite edible in the cold state (i.e., at room temperature), are found to be more palatable and inviting when warmed to a higher temperature. Among such products are the so-called soft pretzels made of dough. Such pretzels can be prepared in various ways for vending, one such way, for example, being disclosed in Reach Patent 3,026,824. According to the method of this patent, the pretzels can be baked and delivered immediately in the hot state by an attendant at the baking premises.

In some cases, it may be desirable to pre-bake and store the pretzels or other comestible products for subsequent heating and vending. This is particularly desirable when there is no attendant at the premises. Again, in anticipation of large and more or less concentrated demand for the pretzels at sports stadiums, market places, or the like, it may be desirable to pre-bake a large quantity of the soft pretzels and store them for later delivery to consumers on demand. Stored pretzels will, of course, become cold; and in the case of soft pretzels, if they are stored for a time, they may absorb moisture from the ambient and become soggy and unpalatable. To make them attractive to customers, they must be heated again (1) to drive off excess moisture without, however, making them altogether dry and crisp, and (2) to render them just warm enough to be pleasingly palatable.

The primary object of the present invention is to provide improved vending apparatus in which comestible products can be stored and in which they can be heated prior to dispensing thereof to bring them to a desirably warm or heated condition.

More particularly, it is an object of the present invention to provide improved vending apparatus for storing packaged soft pretzels or the like and for subjecting them, on demand, to controlled heating just prior to the delivery thereof to a purchaser in readiness for immediate consumption.

Another object of this invention is to provide improved vending apparatus of the coin operated or controlled type for the purpose aforesaid.

A further object of the present invention is to provide improved vending apparatus as above set forth which lends itself to the storage of either fully baked or only partly baked comestible products to be dispensed, and in which the warming of fully baked products, or the completion of baking of the partly baked products, as the case may be, can be effected on demand just prior to delivery thereof to a purchaser.

Still another object of this invention is to provide improved vending apparatus in which the heating or warming cycle can be varied depending upon the nature of the comestible products to be dispensed thereby.

It is also an object of this invention to provide improved containers in which the comestible products can be packaged for dispensing thereof in vending apparatus as above set forth.

A further object of this invention is to provide improved dispensing containers as aforesaid in which the comestible products to be dispensed can be packaged conveniently, and from which such products can be removed easily.

Still a further object of this invention is to provide improved dispensing containers as aforesaid which can be stored compactly in vending apparatus of the type set forth and which will protect the products against accidental damage during normal handling thereof.

Another object of this invention is to provide improved dispensing containers as aforesaid which will safely confine the comestible products stored therein against accidental displacement therefrom during handling through the vending apparatus, and especially during delivery thereof to the purchaser.

Still another object of this invention is to provide improved comestible product containers which will permit practically unimpeded heating of the products stored therein.

It is also an object of this invention to provide improved coin controlled vending apparatus, and improved containers useful therein for the products to be dispensed thereby, which are simple in construction, easy to manufacture, economical in cost, and highly efficient in use.

In accordance with one form of the invention, the vending apparatus may comprise a cabinet enclosed structure having one or more vertically disposed storage magazines in which a plurality of container packaged comestible products, such as soft pretzels, can be stacked vertically on each other. Successively lowermost ones of the packages can be discharged from their respective magazines by a coin controlled plunger mechanism of any suitable form at each magazine and transferred to a suitable heating station. In another form of the invention, the respective packages are transferred by the discharging plungers to a position in the path of a pusher mechanism carried by a motor driven endless conveyor. The pusher then advances the discharged package to the heating station. In either case, the package is held stationary at the heating station for a preset time interval sufficient to permit suitable heating of the comestible product by one or more heaters. At the conclusion of this time interval, a motor operated paddle engages the heated package and advances it to a discharge chute for delivery to the purchaser.

Energization of the two motors and of the heaters is effected automatictally through circuits including switch devices preferably operated by the aforementioned plunger mechanism. The pusher operating motor is automatically shut off when the pusher has completed a fully cycle of movement, and the heaters and the paddle operating motor are automatically shut off by actuation of a switch by the paddle when the latter has completed a full cycle of its operation and has returned to its rest position.

Further in accordance with this invention, the containers for the comestible products may comprise tray-like members open at the top and having a bottom or floor, two upstanding side walls and two end walls which have short, laterally folded flanges extending therefrom. These flanges may extend either outwardly away from their respective end walls, or they may extend inwardly therefrom somewhat over the open top of the tray. In either case, they are disposed substantially horizontally and act as shelves or supports for next higher trays stacked vertically thereon. In each case, the top of the tray remains open, and the bottom or floor of each tray has portions thereof removed therefrom. Thus, heat can readily penetrate to the content of each tray both through the open top and through the effectively open bottom thereof. In the tray structures where the end wall flanges are folded inwardly over the open top of the tray, these flanges act to confine the products in the trays from accidental displacement from the trays or containers. On the other hand, if the flanges are folded outwardly from the end walls, these end walls are preferably formed on a slant or at an angle to the tray floor such that the ends of the pretzels or the like can be slipped under these slanted ends to be confined against accidental displacement from the containers.

Figure 5:
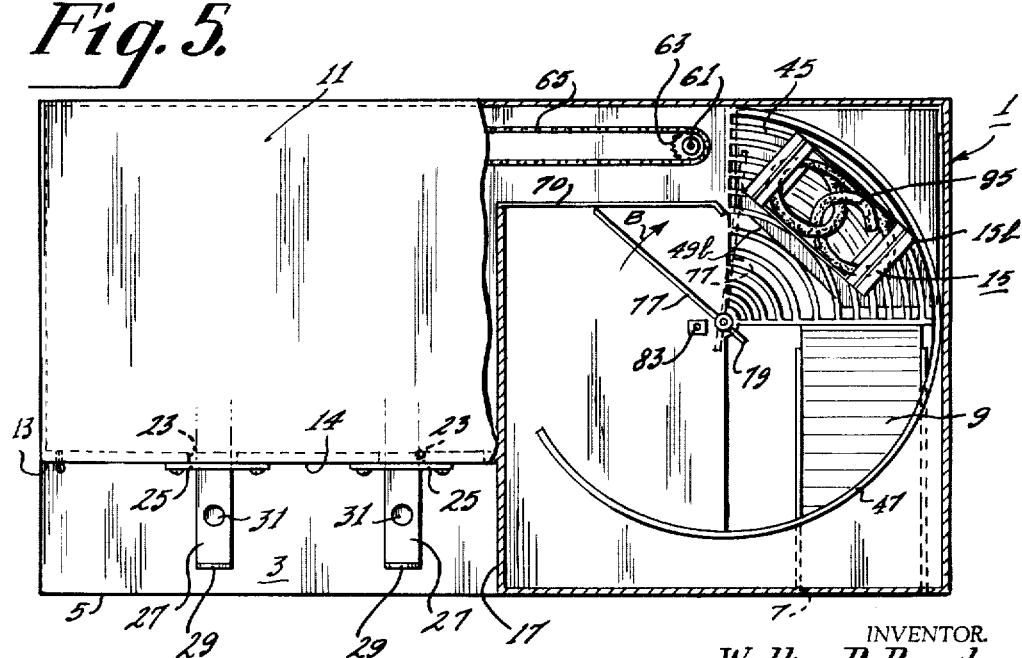
Figure 6:
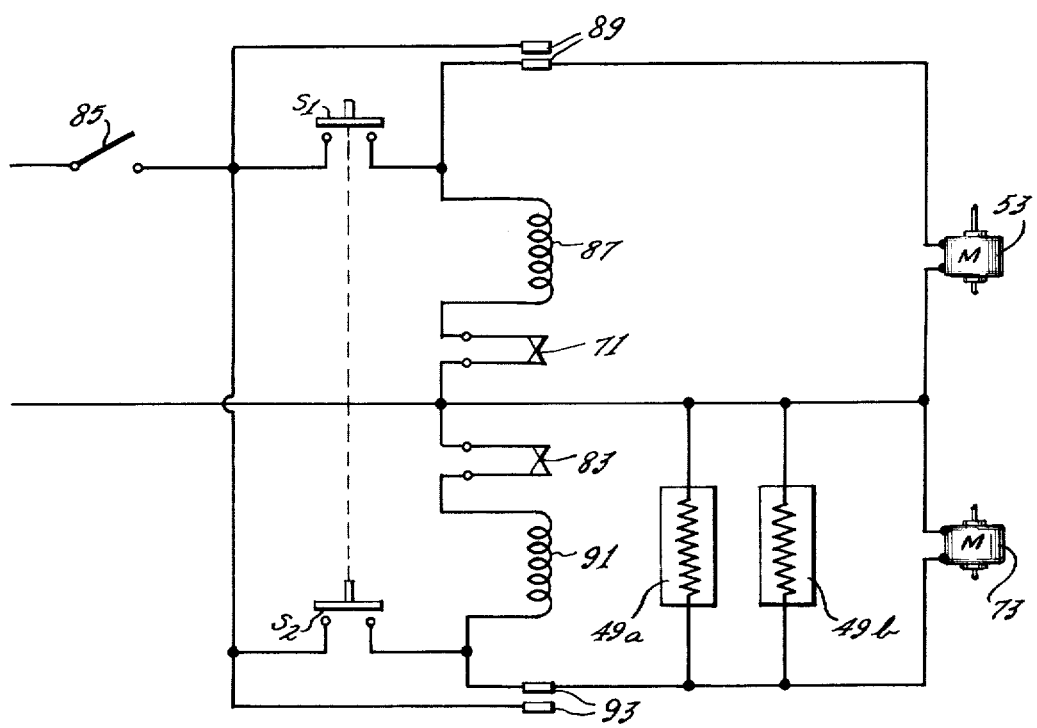
Figure 6A:
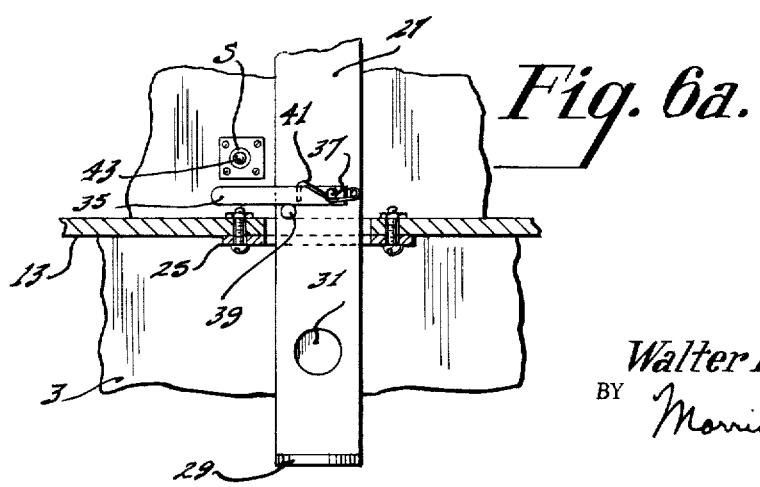

The novel features of the present invention, both as to its organization and method of operation, as well as additional objects and advantages thereof, will be understood more readily from the following description, when read in connection with the accompanying drawings, in which:

FIGURE 1 is a perspective view of one form of vending apparatus according to this invention, FIGURE 2 is a fragmentary front elevation of the vending apparatus of FIGURE 1, part of the front door of the storage compartment being broken away to show portions of storage magazines therein and the stacked arrangement of packaged comestibles stored in the magazines, FIGURE 3 is a fragmentary rear elevation of the vending apparatus with part of the rear wall broken away to again show the stored packages in the magazines and also to show certain of the operating parts, FIGURE 4 is a sectional view taken along the line 4—4 of FIGURE 2 and looking in the direction of the appended arrows, a discharged package being shown in the position it occupies just after the pusher has begun to advance it toward the heating station, FIGURE 5 is a view corresponding to FIGURE 4 but showing the package at the heating station and the paddle approaching the nearly fully heated package to remove it from the heating station and advance it to the discharge chute, FIGURE 6 is a schematic diagram of one form of electric circuit useful in the vending apparatus of FIGURE 1 to effect the various steps of the operating cycle, FIGURE 6a is a fragmentary view of a coin controlled plunger bar with means for initiating the operating cycle, FIGURE 7 is a plan view of a blank from which one form of container may be formed according to the present invention, FIGURE 8 is a perspective view of the blank of FIGURE 7 in partly folded condition, FIGURE 9 is a perspective view of a completely folded tray or container formed from the blank of FIGURE 7 and showing one way of interlocking the folded parts to retain them in folded form or condition, FIGURE 10 is a side elevation of a tray similar to that of FIGURE 9 but showing a different way of retaining the folded parts in folded condition, and FIGURE 11 is a side elevation of another form of tray or container according to the present invention.

Referring first to FIGURES 1 to 5, there is shown a base cabinet 1 having a top shelf 3 beneath which is a front wall 5 formed with an access opening 7 through which delivered, heated products being dispensed can be withdrawn by a purchaser. The heated products are delivered to the access opening 7 by an inclined chute 9 which has its inlet end at the shelf 3. Mounted on the shelf 3 in spaced relation to the chute 9 is a storage cabinet 11 having a front wall 13 on which is hingedly mounted a door 14 which can be opened to permit loading, in a manner shortly to be described, of packages 15 of the products to be dispensed. Also mounted on the shelf 3, alongside of the storage cabinet 1 and over certain of the working parts of the apparatus presently to be identified, as well as over the inlet to the chute 9, is a hood or cover 17. This hood 17 may be provided with an inclined window 19 through which a purchaser of one or more of the products, or a spectator, can watch the operation of the aforementioned parts under the hood.

Within the storage cabinet 11 are one or more magazines 21 in which a plurality of the packages 15 can be stacked vertically on each other, two such magazines being partly shown in FIGURES 2, 3 and 4 by way of illustration. It will be understood, however, that the storage cabinet 11 can be constructed to accommodate as many magazines as may be desired. The magazines may be mounted on the shelf 3.

Below the door 14, the storage cabinet front wall 13 is provided with slots 23 corresponding in number to the number of magazines 21 within the storage cabinet 11. Each slot 23 is aligned with a different one of the magazines 21 and may be surrounded by a similarly slotted escutcheon plate 25. Slidably mounted in each slot 23 is a plunger bar 27 of any suitable coin controlled mechanism of the type commonly employed in vending machines. Each plunger bar 27 may have a thumb piece 29 at its forward end, a coin receiving slot 31 adjacent the thumb piece, and an upstanding lug 33 at its rear end for engaging the lowermost one of the stacked packages 15 in the associated magazine 21. When a coin of proper denomination has been deposited in the coin slot 31, the plunger bar 27 can be pushed forward, as indicated by the arrow A in FIGURE 4, and the lug 33 will push the lowermost package 15 of the associated magazine to discharge it from the magazine to a rest position behind the magazine on the shelf 3, as represented, for example, by the dotted line package 15a of FIGURE 4.

Each plunger bar 27 may be normally urged to its outermost position shown in FIGURES 1, 4 and 5 by spring means (not shown) forming part of the coin controlled mechanism. Each plunger bar has pivotally mounted thereon a laterally extending finger 35 for closing a normally open two-section switch S adjacent thereto as the plunger moves forward in response to manual actuation thereof. The various switches S may be connected in parallel relation across a suitable power line. Closing of any of the switches S by the related plunger bar movement initiates a cycle of operations shortly to be described during which the erstwhile discharged package 15 is transferred from its rest position on the shelf 3 to a heating station and thence, after a suitable time interval, to the delivery chute 9 for delivery to the purchaser at the access opening 7.

The fingers 35 are pivotally mounted on pins 37 on their respective plunger bars 27. Each finger 25 is urged against a fixed stop pin 39 on the plunger bar by a coil spring 41 around the pin 37. One end of the spring 41 is fixed to the bar 27, and the other end is looped around an edge of the finger 35. As the plunger bar 27 is moved manually toward its magazine 21, the finger 35 engages a toggle lever 43 on the switch S to momentarily close the switch and start the cycle of operations mentioned previously. The toggle lever 43 snaps back to its normal position to open the switch S as soon as the finger 35 has passed over and beyond it. On the return movement of the plunger bar, when the finger 35 engages the toggle lever 43, it is turned clockwise on its pivot pin 37 against the force of the spring 41 until it can clear the toggle lever 43, whereupon the spring 41 restores the finger 35 to its normal position against the pin 39. Outward movement of the plunger bar 27 away from its magazine 21 is stopped when the pin 39 engages the wall 13.

The shelf 3 is cut away immediately to the rear of the inlet to the chute 9. Over this cut-away portion, there is disposed, at substantially the level of the shelf 3 and in spaced relation to the cabinet 11, a package supporting member 45. This supporting member is of open-work construction, preferably in the form of a grate which occupies substantially the first quadrant of a circle defined by a circular guide wall or rail 47 on the shelf 3. Above the grate 45 is a first heating unit 49a of any suitable form, the unit 49a being spaced above the grate 45 a distance sufficient to permit entry of a package 15 onto the grate beneath it. Below the grate 45 is a second heating unit 49b. Thus, during the cycle of operations shortly to be described, a package resting on the grate 45 can be heated both from the top and from the bottom.

Mounted on a support 51 to the rear of the magazines 21 is a motor 53, which, through a belt 55, drives a shaft 47 to which a sprocket wheel 59 is fixed for rotation therewith. A second rotary shaft 61 in proximity to the grate 45 carries a second sprocket wheel 63, and trained around the sprocket wheels 59 and 63 is an endless sprocket chain 65 which is thus driven by the motor 53. The chain 65 carries a downwardly extending rod 67 to which is fixed a pusher member 69, the latter being disposed at a level to engage a discharged package 15 because the discharged, rest position of the package 15 on the shelf 3 is in the path of movement of the pusher member 69. As the pusher member 69 advances, it pushes the dicharged package 15 along a guide rail 70 and onto the grate 45 between the heating units 49a and 49b to be heated thereby. Proper positioning of the advancing package 15 is accomplished by the first quadrant portion of the rail 47 which guides the package into heating position when the upper front corner 15b of the advancing package engages the rail 47. After the pusher member 69 has moved the advancing package onto the grate 45, it passes around the sprocket wheel 63 and back toward the sprocket wheel 59. As it passes around the sprocket wheel 59, the pusher member momentarily opens a normally closed switch 71 to stop the motor 53 in a manner shortly to be explained. Thus, the sprocket chain 65 is also stopped and the pusher member 69 resumes its normal, idle or rest position.

Mounted on the lower surface of the shelf 3 is a second motor 73, the drive shaft 75 of which extends through an opening in the shelf at about the geometric center of the rail 47. Secured to the drive shaft 75 above the shelf 3 is a paddle 77 which extends in one direction from the drive shaft 75 and which has a short tail 79 extending in the diametrically opposite direction. The paddle 77 normally occupies a rest position substantially along the lower edge of the grate 45 near the inlet to the chute 9. When one of the switches S is closed upon inward movement of its associated plunger bar 27, the motor 73 is energized, as will be evident shortly, and the paddle 77 begins to turn clockwise, as indicated by the arrows B in FIGURES 4 and 5. The paddle 77 has a cut-out 81 to clear a normally closed switch 83 as it passes this switch. Eventually, the paddle 77 engages the rear end of the package 15 on the grate 45 and, as it sweeps over the grate in its continued movement clockwise, the paddle removes this package from the grate 45 and advances it to the inlet of the chute 9 which then delivers it to the access opening 7 for acceptance by the purchaser. As the paddle 77 approaches its normal, idle or rest position, its tail 79 momentarily opens the switch 83 to thereby stop the motor 73 and thus bring the paddle 77 to rest.

Referring now to FIGURES 6 and 6a, the circuit for accomplishing the various steps in the cycle will be explained. Power to this circuit is supplied from a suitable source through a master or line switch 85. When a selected one of the plunger bars 27 is pushed in, its finger 35 momentraily closes the two-section switch S. When one section S₁ of the switch S is closed, energy is supplied to the motor 53 to start that motor. At the same time, energy is also supplied to the winding 87 of a holding relay in series with the normally closed switch 71. When the relay winding 87 is energized, it closes a pair of contacts 89 and holds these contacts closed, whereby energy continues to be supplied to both the motor 53 and the winding 87, even though the switch section S₁ opens as soon as the finger 35 passes the switch S. As the pusher member 69 nears its rest position, it opens the switch 71 momentarily to break the circuits to the motor 53 and the winding 87, and the motor 53 stops.

When the switch section S₂ is closed, energy is supplied from the power source and through the line switch 85 to (1) the motor 73 to start that motor, (2) the heaters 49a and 49b, and (3) the winding 91 of a second holding relay, the latter being connected in series with the normally closed switch 83. Upon being energized, the relay winding 91 causes a pair of contacts 93 to close, whereby energy continues to be supplied to the parallel circuits of the motor 73, the heaters 49a and 49b, and the winding 91, even though the switch section S₂ opens. As soon as the motor 73 begins to operate, the paddle 77 begins to rotate, but it does not catch up to the package 15 at the heating station until after that package has been at the heating station for a period of time sufficient to heat the product in the package to substantially a desired degree. The heated package is then removed from the heating station by the forwardly moving paddle and advanced to the delivery chute 9. Promptly thereafter, the paddle 77 approaches its normal, rest position and its tail 79 opens the switch 83 to break the circuits to the motor 73, the heaters 49a and 49b, and the winding 91. The apparatus is thus shut off. The time interval during which a package 15 remains at the heating station is determined by the time it takes, after the package has been deposited on the grate 45, for the paddle 77 to catch up to the rear end of the package being heated and for the paddle to sweep over the grate 45. For varying this time interval, the paddle driving motor 73 can be a variable speed motor, for example, and its speed can be varied to suit particular requirements; or a variable reduction gear drive can be interposed between the motor 73 and the paddle 77 for suitable adjustment as desired.

Vending apparatus of the type described is especially useful for vending comestible products such as pretzels, pizza pies, buns, hamburgers, frankfurters, nuts, etc., which are preferably to be heated in readiness for consumption. By way of illustration, the packages 15 are shown packed with pretzels 95. For safe handling of the pretzels or other similar products and proper stacking of the packages 15 in the magazines 21, and for insuring heating of the packaged products at the heating station both from above and from underneath, containers such as shown in FIGURES 7 to 11 may be employed.

Referring, first, to FIGURES 7 to 9, there is shown a container 101 which may be stamped and formed from a generally rectangular blank 103 of suitable material, such as sheet aluminum, cardboard, plastic material capable of withstanding the radiant heat from the heaters 49a and 49b, or the like. The blank 103 is formed with a pair of longitudinally extending bend lines 105, a pair of transversely extending bend lines 107, and a plurality of V-notches 109 to provide, within the central area bounded by the lines 105 and 107, a rectangular bottom or floor 111, and also a pair of side wall sections 113, a pair of end wall sections 115, and a plurality of flaps 117 which extend from the end wall sections 115 adjacent the corners of the bottom 111. The side wall sections 113 are formed with generally U-shaped slits 119 to provide tongues 121 which can be pressed outwardly, and the flaps 117 are formed with slits 123 to provide locking tabs 125. When the sections 113 are bent up along the bend lines 105 to an upright position perpendicular to the bottom 111, they form the upstanding side walls of the container 101. Similarly, when the sections 115 are bent up along the bend lines 107 to an acute angular relation with the bottom 111, as shown in FIGURE 9, they form the upstanding end walls of the container. The flaps 117 can then be bent along the lines 105 and interlocked with the side walls 113 by pressing the tongues 121 outwardly somewhat and inserting the locking tabs 125 through the openings thus provided in the side walls to enable the locking tabs to engage the inner surfaces of the side walls. The end wall sections 115 can then be pulled back somewhat to thus lock the side and end walls in place relative to the bottom and thereby provide a tray-like container with an open top.

It will be noted that the end walls 115 are inclined in diverging relation in a direction from the open top of the container 101 to the bottom 111 thereof. Thus, the inclined end walls 115 overlap the bottom of the container 101 which is made of such length that, when a pretzel 95 is placed therein, the ends of the pretzel will extend under the overlapping end walls 115. The inclined end walls 115 thus confine the pretzel against accidental displacement from the container 101 during handling of the respective packages 15, and especially as they slide down the delivery chute 9. To further protect the pretzels or other contents of the containers and to permit uniform and secure stacking of the packages 15 in the respective magazines 21, the end wall sections 115 are formed with bend lines 127 to provide flange sections 129. These flange sections are bent outwardly away from the open top of each container along the bend lines 127 to extend laterally from and into overlapping relation with the inclined end walls 115. The flanges 129 provide shelf-like supports on which the next higher containers can rest in the respectve magazines 21. The side walls 113 and the end walls 115 are of such height that, when the containers 101 are stacked on each other, as above described, the bottom or floor 111 of each relatively upper container will be spaced from the pretzel or other article or product in the container immediately thereunder to provide safe storage for pretzels or the like.

Since the open top of each container exposes the product packaged therein to the ambient, it is obvious that such product will be readily exposed to radiant heat from the upper heating unit 49a when the package is on the grate 45 at the heating station. To insure that radiant heat from the lower heating unit 49b will also reach the product and thus enhance the heating thereof, the bottom or floor 111 of each container is provided with as many openings 131 as possible while leaving ample support for the product in the container. Thus, the product in the container is also exposed to the ambient and to the radiant heat from underneath by the effectively open bottoms of the container.

The form of container shown in FIGURE 10 is similar to that shown in FIGURE 9. However, in the container 101 of FIGURE 10, the slits 121 and 123 are omitted, and the flaps 117 are secured to the outer surfaces of the side walls 113 by a suitable adhesive 133 which will not deteriorate when subjected to heat.

In FIGURE 11, there is shown a container 101 wherein the end walls 115, like the side walls 113, are perpendicular to the bottom or floor 111. Here, however, the flanges 129a extend laterally from the end walls 115 inwardly over and into overlapping relation with the open top of the container. In this case, the flanges 129a rest on the upper edges of the side walls 113 and serve not only as shelf-like supports for next higher containers in the stack, but also to confine the contents of the respective containers against accidental displacement therefrom. The flaps 117a in this form of container are again extensions of the flanges 129a and are bent over onto the side walls 113 to which they can either be secured by an adhesive, as in FIGURE 10, or with which they can be suitably interlocked through inclined slits 123a.

As is apparent from the foregoing description, there have been provided an improved vending apparatus for dispensing heated comestible and other products, and improved containers for packaging such products for use in such vending apparatus. Although only one form of vending apparatus has been described herein, it will undoubtedly also be apparent to those skilled in the art that other forms thereof, as well as variations in the described form, are possible within the spirit of this invention. For example, instead of using the endless conveyor 65 and its pusher member 69 to advance a discharged package 15 from its rest position on the shelf 3 to the grate 45, there may be provided a suitably contoured, inclined chute between the magazines 21 and the heating station onto which the various plunger bars 27 could be arranged to discharge the packages 15, and this chute could deliver the successive, discharged packages directly to the grate 45. In such case, the magazines 21 would have to be elevated above the shelf 3, and the paddle 77, in its rest position, could be relied upon to arrest the movement of the successive packages delivered to the grate 45, after which the paddle motor 73 could be started in response to the impulse or initial movement imparted to the paddle by the discharged package. Other changes and variations are also possible, as are also other forms of containers for the various products. It is desired, therefore, that the foregoing description shall be considered merely as illustrative, and not in a limiting sense.

What is claimed is:

1. Vending apparatus comprising, in combination, means in which products to be dispensed can be stored for removal therefrom one at a time, means providing a heating station at which said products can be heated, delivery means for delivering heated products to a point of access, means for discharging said products one at a time from said storage means to a rest position, means for thereafter moving the respective, discharged products from said rest position to said heating station to be heated thereat, and means for thereafter advancing the heated products from said heating station to said delivery means for delivery of said products to said point of access.

2. Vending apparatus comprising, in combination, means in which products to be dispensed can be stored for removal therefrom one at a time, means providing a heating station at which said products can be heated, delivery means for delivering heated products to a point of access, manually operable means for discharging said products one at a time from said storage means along a first path to a first rest position, means for thereafter moving the respective, discharged products along a second path at an angle to said first path from said first rest position to a second rest position at said heating station to be heated thereat, and means effective to remove the heated products from said heating station after a period of time during which the respective said products remain in said second rest position and advancing them to said delivery means for delivery of said products to said point of access.

3. Vending apparatus comprising, in combination, a cabinet, storage means in said cabinet for storing products to be dispensed and from which said products are dischargeable one at a time, means laterally spaced from said storage means providing a heating station at which said products can be heated and including product supporting means in a certain plane, delivery means for delivering heated products to a point of access in said cabinet, manually operable means for discharging said products one at a time along said plane from said storage means to a rest position in said plane, means for thereafter moving the respective discharged products laterally along said plane from said rest position to said supporting means at said heating station to be heated thereat, and means for advancing the heated products from said heating station to said delivery means for delivery thereof to said point of access.

4. Vending apparatus comprising, in combination, a cabinet, at least one storage magazine in said cabinet for storing therein, in stacked relation, products to be dispensed and from which said products are dischargeable one at a time, means laterally spaced from said storage magazine providing a heating station at which said products can be heated and including product supporting means in a certain plane, delivery means for delivering heated products to a point of access in said cabinet, manually operable slide means for discharging said products one at a time along said plane from said magazine to a rest position in said plane, means for thereafter moving the respective, discharged products laterally along said plane from said rest position to and positioning them on said supporting means at said heating station to be heated thereat, and advancing means effective after said products have been at said heating station for a predetermined time interval to advance the heated products from said heating station to said delivery means for delivery thereof to said point of access.

5. Vending apparatus according to claim 4 wherein said manually operable slide means comprises a coin controlled plunger associated with said storage magazine.

6. Vending apparatus comprising, in combination, a cabinet, at least one storage magazine in said cabinet for storing therein, in stacked relation, products to be dispensed and from which said products are dischargeable one at a time, means spaced from said storage magazine providing a heating station at which said products can be heated, delivery means for delivering heated products to a point of access in said cabinet, manually operable slide means for discharging said products one at a time from said magazine to a rest position, means for thereafter moving the respective, discharged products from said rest position to and positioning them at said heating station to be heated thereat, said last named means comprising an endless conveyor and a pusher member carried by said conveyor, said rest position being located in the path of movement of said pusher member, and advancing means effective after said products have been at said heating station for a predetermined time interval to advance the heated products from said heating station to said delivery means for delivery thereof to said point of access.

7. Vending apparatus according to claim 6 wherein said pusher member and said means to advance the heated products both have a normal, rest position, said apparatus including a first motor for operating said endless conveyor and a second motor for operating said advancing means, a first switch in circuit with said first motor, and a second switch in circuit with said second motor, said first switch being actuable by said pusher member to open the circuit of said first motor and thereby de-energize said first motor as said pusher member approaches its said normal, rest position after having positioned said discharged product at said heating station, and said second switch being actuable by said advancing means to open the circuit of said second motor and thereby de-energize said second motor as said advancing means approaches its said normal, rest position after having advanced said heated products to said delivery means.

8. Vending apparatus comprising, in combination, a first cabinet having a shelf and a wall beneath said shelf provided with an access opening, a delivery chute having an inlet at said shelf and extending from said shelf to said access opening, a storage cabinet on said shelf spaced from said chute inlet and having at least one magazine for storing therein, in stacked relation, comestible products to be heated and dispensed and from which said stacked products are dischargeable one at a time, means in proximity to said chute inlet providing a heating station at which said discharged products can be heated, said heating station including a product supporting member at substantially the level of said shelf, means for discharging said stacked products one at a time from said magazine and transferring the respective, discharged products to said supporting member at said heating station to be heated thereat, and means for removing the heated products from said supporting member after a predetermined time interval and advancing them to said chute inlet to thereby cause said chute to deliver the respective, heated products to said access opening.

9. Vending apparatus comprising, in combination, a first cabinet having a shelf and a wall beneath said shelf provided with an access opening, a delivery chute having an inlet at said shelf and extending from said shelf to said access opening, a storage cabinet on said shelf spaced from said chute inlet and having at least one magazine for storing therein, in stacked relation, packages of comestible products to be heated and dispensed and from which said stacked packages are dischargeable one at a time, said packages comprising containers open to the ambient at the top and at the bottom to thereby expose the products therein to the ambient, means in proximity to said chute inlet providing a heating station at which said discharged products can be heated, said heating station including (1) a grate at substantially the level of said shelf for supporting said packages at said station and (2) a pair of heating units, one above and one underneath said grate, means for discharging said stacked packages one at a time from said magazine and transferring the respective, discharged packages to said supporting member at said heating station to be heated thereat, and means for removing the heated packages from said grate after a predetermined time interval and advancing them to said chute inlet to thereby cause said chute to deliver the respective, heated products to said access opening.

10. Vending apparatus comprising, in combination, a first cabinet having a shelf and a wall beneath said shelf provided with an access opening, a delivery chute having an inlet at said shelf and extending from said shelf to said access opening, a storage cabinet on said shelf spaced from said chute inlet and having at least one magazine for storing therein, in stacked relation, packages of comestible products to be heated and dispensed and from which said stacked packages are dischargeable one at a time, said packages comprising containers open to the ambient at the top and at the bottom to thereby expose the products therein to the ambient, means in proximity to said chute inlet providing a heating station at which said discharged products can be heated, said heating station including (1) a grate at substantially the level of said shelf for supporting said packages at said station and (2) a pair of heating units, one above and one underneath said grate, manually operable means for discharging said packages one at a time from said magazine onto said shelf at a rest position, an endless conveyor including a pusher member for engaging the respective, discharged packages at said rest position and moving them onto said grate to be heated by said heating units, and a rotary paddle member mounted to sweep over said grate and to engage and remove the heated packages from said grate after a predetermined time interval and advance them to said chute inlet to thereby cause said chute to deliver the respective, heated products to said access opening.

11. Vending apparatus comprising, in combination, a cabinet, at least one storage magazine in said cabinet for storing therein, in stacked relation, products to be dispensed and from which said products are dischargeable one at a time, means spaced from said storage magazine providing a heating station at which said products can be heated, delivery means for delivering heated products to a point of access in said cabinet, manually operable slide means for discharging said products one at a time from said magazine to a rest position, means for thereafter moving the respective, discharged products from said rest position to and positioning them at said heating station to be heated thereat, and advancing means effective after said products have been at said heating station for a predetermined time interval to advance the heated products from said heating station to said delivery means for delivery thereof to said point of access, said advancing means comprising a rotary paddle member, and said heating station being located along the path of rotation of said paddle member.

(References on following page)

References Cited by the Examiner

UNITED STATES PATENTS

| | | | |
|---|---|---|---|
| 1,734,045 | 11/1929 | Parran | 222—150 |
| 2,439,550 | 4/1948 | Smith | 221—268 |
| 2,834,510 | 5/1958 | Cenotti | 221—150 |
| 2,901,964 | 9/1959 | Johnson | 221—150 |
| 2,913,143 | 11/1959 | Compton | 221—268 |
| 2,935,225 | 5/1960 | Jordan et al. | 221—150 |
| 3,035,735 | 5/1962 | Presnick | 220—62 |
| 3,038,634 | 6/1962 | Cheeley | 220—62 |
| 3,160,255 | 12/1964 | Ferraro et al. | 221—150 |

FOREIGN PATENTS 924,516   4/1963   Great Britain.

RAPHAEL M. LUPO, *Primary Examiner.*

WALTER SOBIN, *Examiner.*